Figure 1:
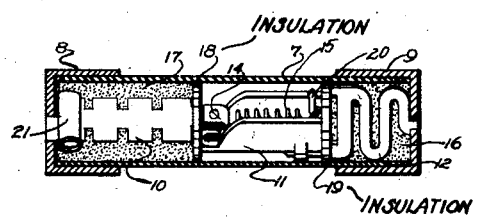

Nov. 3, 1942.   M. F. DUERKOB   2,300,620
ELECTRICAL PROTECTIVE DEVICE
Filed April 25, 1938   2 Sheets-Sheet 1

INVENTOR.
MANFRED F. DUERKOB
BY
Roy M. Eilers
ATTORNEY.

Nov. 3, 1942.  M. F. DUERKOB  2,300,620
ELECTRICAL PROTECTIVE DEVICE
Filed April 25, 1938  2 Sheets-Sheet 2

INVENTOR.
MANFRED F. DUERKOB
BY
Roy M. Eilers
ATTORNEY.

Patented Nov. 3, 1942

2,300,620

UNITED STATES PATENT OFFICE 2,300,620

ELECTRICAL PROTECTIVE DEVICE

Manfred F. Duerkob, St. Louis, Mo., assignor to McGraw Electric Company, Chicago, Ill.

Application April 25, 1938, Serial No. 204,249

40 Claims. (Cl. 200—123)

My invention relates to protectors for the protection of electric circuits and for the protection of energy translating devices which may form a part of a circuit.

An object of my invention is to provide an overload protector having an operating time lag comparable to that of the circuit or the energy translating device to be protected so that it will not operate needlessly on harmless overloads and yet will adequately protect against all overloads which could cause damage, including overloads caused by short-circuits.

Fuses used heretofore for the protection of electric circuits perform satisfactorily under short circuit conditions but do not possess the time lag to hold the starting currents of motors or other harmless overloads. Thermal cutouts used for the protection of motors possess sufficient time lag but cannot operate safely on short circuits. By my invention the desirable characteristics of both forms of protectors are combined in a unitary device.

It is also an object of my invention to provide a protector as above described capable of being made in all the sizes in which enclosed fuses are made.

Another object of my invention is to provide such a protector of the same external dimensions as those of an enclosed fuse of the same rating in order to give users the benefit of such protection on installations already made.

Cartridge fuses as used heretofore reach rather high temperatures when operated at or near their full load rating, particularly when such fuses are enclosed in cabinets, or when subjected to poor contact. Such high temperature causes considerable deterioration or actual destruction of the fibre tube used for the enclosure of the fuse. It is, therefore, another object of my invention to provide such a protector that will prevent the enclosure being subjected to any temperature rise that could cause injury or deterioration thereof.

My invention also has for an object to provide a simple and economical method by means of which protectors of the same rating and of the same general design can be caused to have such different time lags as different circuits may render desirable.

My invention constitutes an improvement in that general class of protectors in which a fuse link and a mechanically-operable thermally-controlled circuit interrupter are combined in a unitary device. In such devices operation at lower overloads usually takes place in the mechanical interrupter and at higher overloads in the fuse link.

By my present invention I provide a protector of this general class which is free from certain characteristics tending to restrict the rating of the protector to relatively low values. My protector, accordingly, may be made in relatively high ratings.

Figure 2:
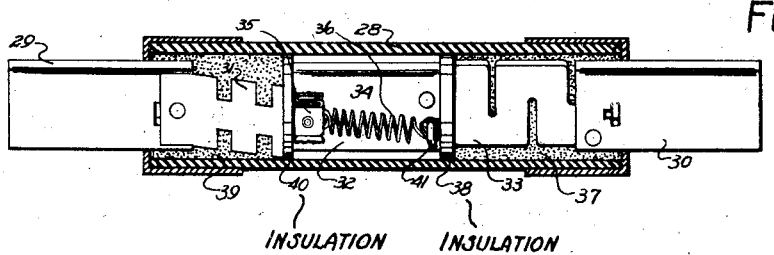
Figure 3:
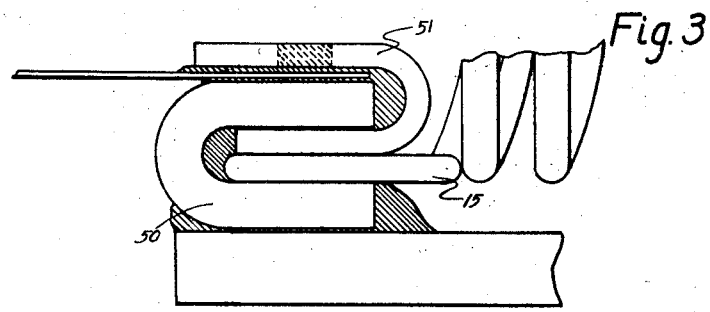
Figure 4:
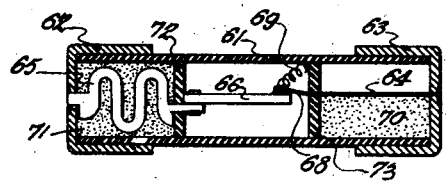
Figure 5:
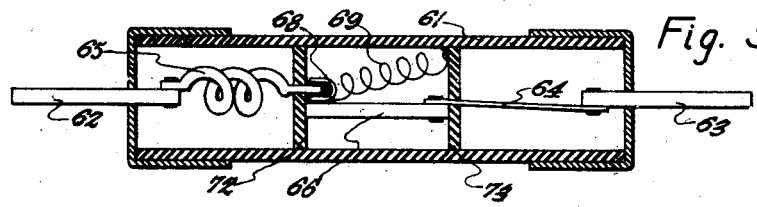
Figure 6:
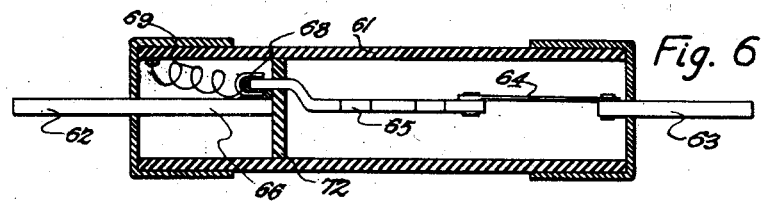
Figure 7:
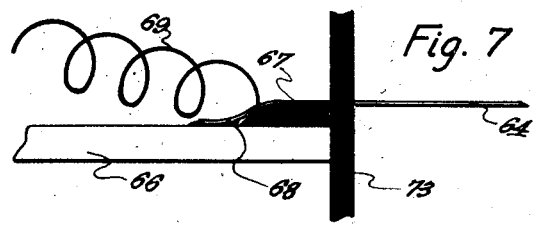
Figure 8:
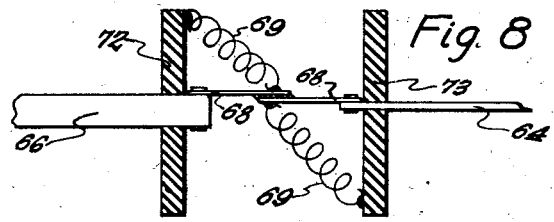

In the drawings Figures 1 and 2 show preferred forms of protectors embodying my invention, a portion of each enclosing casing being cut away. Fig. 3 shows an enlarged view of the movable and fixed contacts of the mechanically-operable thermal circuit interrupter. Figs. 4, 5 and 6 show modified forms of protectors embodying my invention which may be used for certain desired time lag and rating characteristics, portions of the casings being cut away as before. Figs. 7 and 8 show enlarged views of modified forms I may use for the connection which is opened when the mechanically-operable circuit interrupter operates.

Fig. 1 shows a casing 7 of insulating material having contact terminals 8 and 9 attached thereto. This figure shows the standard form of cartridge enclosed ferrule type fuses. Obviously any other form of enclosure may be used.

The fuse link 10 is electrically connected to contact terminal 8 in any desired manner. This link may be of any desired material and of any desired design and rating and may be surrounded by an arc extinguishing filler 17.

11 is a heat absorbing member of good thermal conductance and of such low electrical resistance that under operating conditions the amount of heat generated therein will be substantially negligible as compared to the amount of heat conducted thereto. It is accordingly made relatively massive. In a preferred form I use copper as I find that copper serves very satisfactorily in most cases, but I may use any other metal or alloy if desired for special time lag characteristics.

12 is a heat generating member connected, as by riveting and soldering, to the member 11 and the contact terminal 9. This member may be of any shape and design desirable and may have any desired resistance, and may be of any material depending on the amount of heat desired.

A portion of the fuse link 10 and a portion of the heat absorbing member 11 constitute substantially fixed contact members of a mechanically-operable thermal circuit interrupter. This interrupter includes a small, light, good conducting movable connector 14 shown in greater detail in Fig. 3 which is normally held in position to electrically and thermally connect the fuse link and the heat absorbing member by solder. A spring 15 is provided to move the movable connector 14 out of connecting position when the solder has been heated to a temperature at which it loses its holding power.

17 shows arc extinguishing filler preferably used to surround the fuse link 10 and held in place by insulating washer 18. 19 is an insulating washer for holding in place the filler 16. The space between the washers 18 and 19 provides a chamber for the expansion of gases generated on the blowing of the fuse link, such gases escaping around the edge of the washer 18. This materially helps to obtain safe and quiet operation on short circuits.

This space also serves to allow the connector 14 with its spring 15 to have free and unimpeded movement so as to insure dependable operation thereof. A hook 20 is attached to the washer 19 to hold the end of the spring 15. This hook being attached to an insulating washer renders the spring substantially free from any current flow therethrough which prevents the possibility of its tension being impaired by heating.

A baffle, 21, is attached to the fuse link to keep hot gases generated when the link is blown from coming in contact with the solder securing the link to the ferrule 8. This prevents the possibility of fusion of the solder, or of that part of the link extending through the ferrule, allowing the escape of dangerously hot gases from the casing.

The movable connector 14, which is shown in more detail in Fig. 3, consists of two U-shaped pieces of metal 50 and 51 interlocked as shown. The piece 50 is tightly clamped over one side of the piece 51 and an end portion of the spring 15 and is of relatively thick material in order to hold these parts firmly together. The link end is fitted in the space between 50 and 51 and soldered, 51 having a hole in the side adjacent the link through which solder can be flowed. 51 is of thinner metal in order to keep down weight.

In the higher ratings the link must be of substantial thickness and the expansion therein when heated might cause the link to spring away from the connector when the solder is partly softened but not softened enough to allow of the connector being withdrawn. The destructive arcing which might occur should this happen must be guarded against. It is for this purpose that the piece 51 is provided, it prevents a slow partial opening of the circuit and ensures that when the interrupter breaks the circuit it will do so quickly and safely.

It will be noted that the structure as a whole has considerable solidity and rigidity from one terminal to another. As a result mishandling of the device in transportation, its use in places where subjected to considerable vibration or other factors which might tend to injure a less rugged device will not impair the efficiency of my protector either by preventing its opening when intended or by causing premature opening.

It will also be noted that all parts are extremely simple and easy to manufacture. The parts are mounted in the open and no intricate assembly operations are necessary. All connections, except those to the movable connector, can be riveted solidly and maintained in uniform conducting capacity. This makes for ease in assembling and for great uniformity of operation.

The contact terminals 8 and 9 serve also as caps for closing the casing 7 and are fastened thereto in any normal manner.

The heat producing member 12 may be varied so that a wide range in time lag and rating can be obtained by this means alone. For example, all sizes between 70 and 100 ampere ratings may be made with no change of parts except the heating element. This makes for greater economy of manufacture and for greater uniformity of product.

I have shown the operating means as a helical spring 15 as used in the preferred form of my invention. It is obvious, however, that different means of withdrawing the connecting member 14 from connecting position may be employed if desired.

I prefer to use for the heat softenable material in the interrupter a solder of correct melting point but if the movable portion 14 makes good contact with both the link 10 and the member 11, it may be held in position by a non-conducting heat softenable material such as a wax. By "heat softenable material" I mean a material which within a certain range of temperature possesses a certain rigidity, or cohesion, presenting resistance to a distorting force and which loses this resistance when heated to higher temperatures whether the loss be done to "softening" or to other physical change.

The operation of the protector is as follows:

When a current is passed through the device heat will be generated in the fuse link and in the heat generating member. By proper choice of materials, dimensions and design I can obtain temperature rises in these members of desired values. The temperature rise in the heat absorbing member will be due only to the heat conducted thereto, the heat generated therein being negligible. The temperature of the fuse link and of the heat producing member will rise and heat will flow into the interrupter and the heat absorbing member raising their temperatures and that of the heat softenable material. If the overload be great enough and continues long enough the temperature of the heat softenable material will attain a value at which its holding power is lost and the circuit will be opened by withdrawal of the connecting member from connecting position. The time required for this to take place will be prolonged because of the heat absorbed by the heat absorbing member, the greater its heat absorbing capacity, the greater the time lag, other things being equal.

The fuse link 10 must be of sufficient capacity to prevent the blowing of the link on harmless overloads caused by high currents of short duration. The higher its capacity, the less the heat provided to melt the solder on the interrupter on long continued low overloads. I therefore provide the heat producing member 12 so that sufficient heat can be generated on long continued low overloads to insure the melting of the solder and the opening of the device under such conditions. By that method I obtain greater time lag.

Where maximum time lag is not necessary I may use another fuse link similar to 10 instead of the member 12. This form of construction may also be used where it is necessary to obtain greater interrupting capacity on extremely heavy short circuits. The disadvantage of such a construction in addition to lesser time lag, is that the exact rating, or the current carrying capacity of the device is dependent on the accuracy of the fuse links. Obviously these links must be relatively thin. Slight variations in the thickness of the links as normally occur in commercial production cause considerable variation in such rating or current carrying capacity. Such variation is materially reduced by the use of the heat producing member 12 which can be made much thicker than the link and which, with the same variations in production will show lesser variation in the rating or current carrying capacity of the device.

This member 12 may have as high a resistance as the fuse link 10, or even higher resistance, but its design and the material used is such that a mass of metal is provided which is so great that it will not fuse at any overload.

Therefore, while the resistance of the member 12 may be as great as the fuse link or greater, its temperature rise will be slower as the heat generated in this member must first raise the temperature of the large mass of metal itself before any heat is conducted to the heat absorbing member and to the solder in the interrupter. Since heat flows only from a higher temperature to a lower temperature, and since the rate of flow is increased with an increase in the difference between the two temperatures, the heat producing member which takes the longest time to build up its temperature and conduct its heat to the operating solder will cause the slowest rate of temperature rise of the operating solder or the longest time lag.

I have found that by using the heat generating member as a temperature regulator I am able to get a wider range of time lag and of rating without the necessity of making any parts of the device so large as to make enclosure in a casing of the required size difficult in the higher ratings.

If the heat producing member 12 be so designed that the temperature rise therein be less than the rise in the heat absorbing member by conduction from the fuse link, it becomes essentially just an addition to the heat absorbing member to increase its heat absorbing capacity. On the other hand, if the heating member be so designed that its temperature rise is slightly greater than that of the heat absorbing member, it will conduct a small amount of heat to the heat absorbing member, but its main purpose will be to serve as a dam or baffle to prevent heat being conducted away from the heat absorbing member. Again the heating member may be so designed that its temperature rise is substantially faster than that of the heat absorbing member. In this case it will conduct heat to that member and hence to the heat softenable material. In fact, if I so desire, I may so design the heating member and the fuse link that the greater part of, or even substantially all, the heat to raise the temperature of the heat softenable material is obtained from the heating member.

In protectors of relatively low ratings the heating member can be a coil of relatively small and flexible wire. Such wire can be wound around the heat absorbing member with such uniformity that the heat transferring path between the two can be held practically constant with little difficulty.

In protectors of relatively high rating the heating member must be made of heavier material and will be correspondingly stiffer and harder to form. The difficulty of winding coils of such material around the heat absorbing members in such manner as to afford substantially uniform heat transferring paths between them is, accordingly, greatly increased.

In my invention the heat producing member and the heat absorbing member are so positioned and connected that the heat transfer path between them is substantially constant. Almost no heat transfer can take place between these members except by conduction through the electrical connection between them. This connection can easily be maintained constant, as by riveting and soldering. The necessity of uniformity of heat transfer between parts of the protector if uniformity of operation is to be obtained is obvious. The fact that by my invention uniformity of heat transference is provided for is another reason why I am able to make my protector in relatively high ratings.

By this construction heat conducted from the heating element to the solder must traverse the whole length of the heat absorbing member and cannot heat the solder to the softening point until the whole mass of the heat absorbing member has attained that temperature. This makes for substantial increase of time lag.

The heat producing member may be surrounded by a filling material 16 of great or less heat conducting power in order to regulate the heat loss therefrom.

I make the fuse link 10 short so as to reduce the volume of metal that must be volatilized on a short circuit. Reducing this volume of metal naturally results in increased amount of heat being generated in the fuse link at lower overloads but by my construction increased temperatures are avoided. As both ends of the link are connected to relatively massive good conducting members, the contact terminal 8 and the member 11, heat is conducted away so rapidly that the link remains inoperative except on short circuits, where the conduction of heat away from the link cannot possibly be fast enough to prevent the burning out of the link. The heat being conducted away rapidly into these massive parts prevents the building up of any high temperature which might injure the tube when the protector is operating at normal load.

In the ordinary fuse the hottest portion of the link, the portion midway between its ends, is positioned midway between the ends of the casing. It is obvious then that that portion of the tube which becomes the hottest is that portion which is at the greatest distance from any parts that might conduct heat away from it, the tube itself being a poor conductor of heat. This often results in the tube becoming deteriorated or injured on long continued loads near the blowing point of the fuse. In my protector the member 11, situated substantially midway between the ends of the casing, has a substantially negligible resistance and is heated only by conduction from hotter parts of the protector. It is further prevented from being unduly heated by the softening of the solder. These factors ensure against any excessive temperature rise of the tube.

It is also obvious that on protectors of high ratings it is necessary that the interrupter be capable of successfully breaking heavy currents as otherwise time lag at low overloads would not be obtained. It is also obviously necessary that the break be rapid and the break distance of considerable length.

To build a protector of this class for relatively high ratings, it is obvious that the fuse link used must be relatively massive, relatively hard to bend. Usually the fuse link must be surrounded with an arc extinguishing filler to permit it to operate properly on heavy short circuits. Under such conditions it is obvious that if the fuse link must be moved or bent to operate the interrupter, the rating of the device will be restricted to low values.

By my invention I can use a fuse link as heavy and inflexible as desired and can pack arc quenching material around it as tightly as desired without effect on the quickness or length of break. This is because all the massive members of my mechanical interrupter remain in substantially fixed position during its operation. The movable connecting piece 14 being of small size and of light weight permits the use of a spring, or other operating means, small enough to be readily enclosed in casings of the same size as fuses of the same rating. It also permits the use of a weak spring. A weak spring puts but little stress on the heat softenable material and thereby prevents the deterioration of its holding power which might result in time if it were subjected to a large force.

It will be noted that a double break is also obtained, which makes for quicker extinguishment of any arc which is set up, the advantage of which is readily apparent.

It is further to be noted that when the interrupter operates, the resulting arc will be between the member 11 and the link 10. The member 11 being quite massive, will have substantial capacity to conduct away much of the heat of the arc preventing the burning of that member. On the other hand the link 10 being relatively light may burn off, but as only a small portion of the link is exposed, the arc in order to continue would have to burn back that portion of the link enclosed in the arc extinguishing filler 17. By this construction the continuance of the arc when the interrupter operates is substantially prevented.

The solder or heat softenable material used on the interrupter may have a melting point of any desired value. The melting point should not be too high as otherwise the temperature rises might be such as to injure the tubing or to injure the spring 15. It must not be too low because heating of the cables, switches and clips used in conjunction with the protector might cause the protector to open at normal loads, particularly where the protector is mounted in enclosures that permit little or no ventilation. Furthermore, the lower the melting point of the solder the less tolerance there will be to take care of manufacturing variations. That is to say that where the melting point is too low, the difference between the temperature of the solder under conditions at which it should hold and the temperature of the solder under conditions at which it should soften, is too small. In my protector I prefer to use a solder having a softening point as high as possible and still not high enough to permit a temperature that would injure the tube or spring, and thereby permit a substantial tolerance between the temperature at which the solder must hold and the temperature at which it must soften. Such higher melting point solder also has greater mechanical strength.

By locating the interrupter approximately in the center of the protector, the effect of extraneous heating from the clips holding the protector and the cables connected thereto is materially reduced. This does not prevent the operation of the interrupter if the extraneous heating reaches dangerous temperatures, such as would char the ends of the fibre tube enclosure, but it does prevent the operation of the interrupter if such extraneous heating is relatively harmless. Furthermore, if the interrupter were located near one of the contact terminals, more heat would have to be generated to cause its operation because the cables and clips in contact with the terminal would dissipate more of the heat from the interrupter than is possible under my construction. By using a portion of the member 11 as a fixed contact for the interrupter, a substantial holding or mounting means is provided to hold the movable connector 14 to guard against any mechanical failure of the interrupter.

Fig. 2 shows a preferred form of protector embodying my invention enclosed in a casing of the type ordinarily referred to as "knife blade cartridge enclosed fuses." 28 shows a casing of insulating material having contact terminals 29 and 30 attached thereto. The fuse link 31 is connected to contact 29 as by riveting and soldering. 32 is the heat absorbing member connected to the heat producing member 33 which in turn is connected to the contact 30. 34 is the interrupter having movable portion 35 held in position by heat softenable material. 36 is the spring for moving the movable portion 35 out of connecting position. 37 is the filler surrounding the heat producing member and is held in position by a washer 38. 39 is the arc extinguishing filler surrounding the link held in position by washer 40. The hook 41 holds the spring 36 under tension and is attached to the washer 38.

Fig. 4 shows a modified form of my protector in a rating corresponding to that of a cartridge enclosed fuse of the ferrule type. A casing 61 having contact terminals 62 and 63 thereon encloses a fuse link 64, a heat generating member 65, a heat absorbing member 66, a movable connecting member 68 and operating means 69, consisting of a coiled spring, to move the connecting member to open circuit position. The contact terminals, the fuse link, the heat generating and heat absorbing members are all electrically connected, one of the connections being maintained by the movable connecting member 68 which is held in connecting position by heat softenable material. The other connections may be permanently secured in place by riveting, or soldering, or both.

In the preferred form shown the movable connector connects the fuse link and the heat absorbing member, and the heat softenable material may be a low melting point solder. The coiled spring 69 acts on the connecting member 68 to move it to break the circuit when the heat softenable material has been heated to a point where it is unable to withstand the pull of the spring 69.

The fuse link 64 may be surrounded by an arc quenching filler 70 to ensure better performance on short circuit. The heat generating member 65 may be surrounded by filler 71 to control the amount of heat conducted from the member 65 to the casing and to restrict venting through this end of the casing. 72 and 73 are insulating washers of a size to snugly fit in the interior of the casing to confine the fillers and to provide a space in which the spring 69 may move the connector 68 without interference. One of these washers also serves as anchorage for the spring 69 and one or both may serve to hold the heat absorbing member 66 in position.

It will be observed that the construction shown renders the spring 69 substantially free from current flow therethrough and that the fuse link is substantially free from stress caused by the spring until the heat softenable material has been softened.

The connector 68 is shown formed as an integral part of the fuse link as I prefer to make it that way in such ratings as permit of the use of a relatively flexible fuse link. In other ratings I may provide for greater ease of movement of the connector 68 by forming it as a separate part and attaching it to the link or other member as described later.

In Fig. 5 is shown a preferred form of my invention in a knife blade enclosed fuse size. Corresponding parts are referred to by the same numbers used in Fig. 4. It will be noted that in this form the connector 68 is shown as connecting the heat generating member 65 and the heat absorbing member 66 and that it is shown as a separate part which may be moved by the spring 69 out of contact with both 65 and 66 when the heat softenable material has been heated. This style of connector is particularly effective in producing a quick break when the protector is of relatively high rating and the component parts are therefore necessarily made relatively massive and unbending.

Fig. 6 shows a modified form of knife blade protector embodying my invention. Corresponding parts are referred to by the same numbers as before. In this modification the fuse link 64 and the heat generating member 65 are contained in the same compartment of the casing and may be surrounded by a filling material which serves both to quench an arc and to control heat conduction to the casing. In this modification the breakable connection is between the heat generating member 65 and the heat absorbing member 66. The heat absorbing member 66 is formed as an extension of the contact terminal 62. The movable connector 68 is not permanently connected to either 65 or 66 but is held in connection with both by heat softenable material. When this material is softened the spring 69 moves 68 out of its connection with both 65 and 66. The spring is anchored to the casing so as to be substantially free from current flow therethrough as before.

This modification can be made to give great time lag because of conduction of heat to the terminal and line connections but possesses the disadvantage that owing to variations in the clip contact where the protector is connected to the line the uniformity of performance which can be assured is less than with other forms of my invention.

Fig. 7 is an enlarged fragmentary view showing a modified form of movable connector for use in protectors embodying my invention. An end portion of the fuse link 64 is bent to form the connector 68 and is held in electrical connection with an end portion of the heat absorbing member 66 by heat softenable material. A block of insulation material 67 to which a coiled spring 69 is attached is pulled between the movable connector 68 and the member 66 when the heat softenable material is softened. This not only moves the connector to break the circuit but interposes the insulating material between the arcing contacts and prevents the holding of an arc. The shape to which the movable connector 68 is bent and the shape of the forward end of the insulation block 67 are such as to enable the use of a light spring for producing this movement.

Fig. 8 is an enlarged fragmentary view of another modification I may employ for breaking the circuit in the heat softenable material. Flexible connection members 68 and 68 are attached to end portions of the link 64 and of the heat absorbing member 66 and are normally held in closed circuit position by heat softenable material. Springs 69 and 69 connected to washers 72 and 73 move 68 and 68 apart when the heat softenable material is softened. This modification affords a long break distance effective to extinguish an arc which might tend to persist when the circuit is opened.

It will be obvious to those skilled in the art that while by my invention I have provided a protector capable of being made with different time lags and in relatively high ratings, I have provided a protector equally efficient at low ratings as well.

While I have described a preferred and modified forms of my invention and noted various materials that may be used, I do not desire to be limited to the exact details noted as other modifications may be made in the device embodying my invention without departing from the spirit and scope thereof.

What I claim is:

1. A protector for electric circuits comprising a contact terminal member, a plurality of heat generating members, at least one of which is adapted to fuse and thereby open the circuit on predetermined overload of the protector, a member constructed and arranged to absorb an appreciable portion of the heat generated in the protector and thereby increase the time lag thereof, means in contact with two of said members and including heat softenable material in contact with one of said members normally maintaining said two members in electrical connection, and means adapted to break said connection in the heat softenable material at said contact with said one member when the heat softenable material is softened, the major portions of all said members remaining in substantially fixed position when said connection is broken.

2. A unitary assembly adapted to be inserted in a casing and to constitute a protector for electric circuits, said assembly comprising a contact terminal member, a plurality of heat generating members, at least one of which is adapted to fuse and thereby open the circuit on predetermined overload of the protector, a heat absorbing member, means normally electrically connecting two of said members, said connecting means including heat softenable material and at least one electrical connection normally maintained by said heat softenable material, and operating means substantially free from current flow therethrough adapted to become movable when said heat softenable material is heated to a predetermined temperature and to move a portion of said connecting means to break all said connections normally maintained by said heat softenable material, the major portions of said two members normally connected by said connecting means remaining in substantially fixed position during the connection-breaking movement.

3. A unitary protector for electric circuits comprising terminals, a fuse link member, a heat absorbing member relatively remote from said terminals, said members being in series relation between the terminals, a connector member, heat softenable material normally holding said connector member in said series relation, and means substantially free from current flow therethrough adapted to move the connector member to open the circuit when the heat softenable material has been heated to a predetermined temperature, said fuse link member and said heat absorbing member remaining in substantially fixed position when the circuit is opened by moving the connector member.

4. A protector for electric circuits comprising means to open the circuit by fusion in a part thereof, means to generate heat, means to absorb heat, means in contact with two of said means normally maintaining electrical connection between said two means, said connecting means having a readily consumable portion and a relatively arc resistant portion, and resilient means adapted to move the arc resistant portion of said connecting means to break said connection when said connecting means is heated to a predetermined temperature, said resilient means being positioned relative to said absorbing means so it is at least partially coextensive therewith, said two means normally connected by the connecting means remaining in substantially fixed position during the connection breaking movement.

5. A unitary protector for electric circuits comprising a terminal member, a plurality of heat generating members, at least one of which is adapted to fuse and thereby open the circuit, a member constructed and arranged to absorb an appreciable portion of the heat generated in the protector and thereby increase the time lag thereof, a connector, heat softenable material normally holding said connector in contact with two of said members said connector being adapted to be moved to open the circuit adjacent at least one of the said two members when the heat softenable material is softened, said two members normally in contact with the connector remaining in substantially fixed position when the connector is moved to open the circuit, said connector and said absorbing member being positioned between said heat generating members and normally maintaining them in electrical conducting relation, said heat generating members being spaced apart a distance greater than the length of the connector.

6. A unitary protector for electric circuits comprising a casing, contact terminals, a fuse link and a mechanically-operable thermal circuit interrupter in the casing, said interrupter including substantially fixed contact members, a movable member normally electrically connecting said contact members, means normally holding said connecting member in connecting position and adapted to lose its holding power when heated to a predetermined temperature, means to move said connecting member out of connecting position when the holding means has lost its holding power and a relatively massive member of good heat and electrical conductivities adjacent said holding means and relatively remote from said contact terminals, adapted to absorb heat to control the rate of temperature rise of the holding means, a portion of said control member and a portion of said fuse link constituting substantially fixed contact members of the interrupter.

7. A unitary protector for electric circuits comprising terminal members, a plurality of heat generating members, at least one of which is adapted to fuse and thereby open the circuit on predetermined overload of the protector, a member constructed and arranged to absorb an appreciable portion of the heat generated in the protector, means, including heat softenable material in contact with two of said members, normally electrically connecting said two members, all parts of said means that are free from softening and are relatively arc resistant, and at least a portion of the heat softenable material being adapted to be moved out of contact with one of said members to break said connection, the major portions of said two members in contact with the heat softenable material remaining in substantially fixed position when said connection is broken, and arc quenching filler material that contacts and covers substantially all portions of the heat generating member that are not in direct engagement with other parts of the protector.

8. A unitary protector for electric circuits comprising a fuse link and a mechanically-operable thermal circuit interrupter having contact members maintained in substantially fixed position and a relatively light movable connector normally held in position to electrically connect said contact members and having a portion adapted to aid in maintaining said fixed position of the contact members and to prevent opening of the circuit when the connector is in connecting position.

9. A unitary protector for electric circuits comprising a fuse link and a mechanically-operable thermal circuit interrupter, said interrupter including a relatively massive member of good heat and electrical conductivities arranged to control the rate of temperature rise of the interrupter to provide a relatively long time lag in the operation thereof, a movable member normally in electrical connection with said link and said relatively massive member, and a spring biasing said movable member for movement out of said electrical connection to open the circuit, a portion of said link constituting a readily consumable, substantially fixed contact member of the interrupter, said interrupter being arranged to absorb heat from said fuse link, said fuse link having within its length a portion of reduced cross-sectional area adjacent the interrupter that is adapted to restrict conduction of heat therethrough to said interrupter from other portions of said fuse link.

10. A unitary protector for electric circuits comprising contact terminals, a fuse link and a mechanically-operable thermal circuit interrupter; said interrupter including heat softenable means normally holding the interrupter in closed position and adapted to lose its holding power when heated to a predetermined temperature, resilient means to open the interrupter when the holding means has lost its holding power and a member in direct contact with said holding means and free from direct contact with said contact terminals adapted to control conduction of heat to and from said holding means to provide a relatively long time lag in the operation of the interrupter, a portion of said fuse link constituting a substantially fixed contact member of said interrupter, said resilient means being positioned relative to said control member so it is at least partially coextensive therewith, said fuse link having within its length a portion of reduced cross-sectional area that is arranged to retard conduction of heat therethrough from other portions of said link to said holding means.

11. A unitary protector for electric circuits comprising a fuse link and a mechanically-operable thermal circuit interrupter, said interrupter including a movable contact member, heat softenable means normally holding said contact member in closed circuit position and adapted to lose its holding power when heated to a predetermined temperature, a member having predetermined physical characteristics adapted to control conduction of heat to and from said holding means to provide a relatively long time lag in the operation of the interrupter, said movable contact member and said control member being normally related by said heat softenable means so only a small portion of the control member is intimately contacted by said movable contact member and so one end of said contact member extends longitudinally beyond one end of said movable contact member, a portion of said fuse link constituting a substantially fixed contact member of the interrupter, and a spring adapted to move the movable contact member to break the circuit between it and the fuse link.

12. A unitary protector for electric circuits comprising a fuse link and a mechanically-operable thermal circuit interrupter including a heat control member having a resistance portion adapted to be heated by heat generated therein on passage of a current through the protector and a portion of lower resistance adapted to be heated by heat conducted from said resistance portion, said link and said heat control member remaining in substantially fixed position during operation of the interrupter and a portion of said link constituting an arcing contact of the interrupter.

13. A protector for electric circuits comprising a fusible member, a heat generating member, a heat absorbing member, connections electrically connecting said members, heat softenable material normally holding one of said connections in closed position and adapted to lose its holding power when heated, opening means substantially free from current flow therethrough and becoming operative when said holding means has lost its holding power, to move a relatively small portion only of one of said members to break said one connection, the greater portions of said members remaining in substantially fixed position during said breaking.

14. A unitary protector for electric circuits comprising a terminal contact member, a fusible member, a heat generating member, a heat absorbing member, a heat softenable material normally holding two of said members in electrical connection and means, including a body of insulation material adapted to be moved for separating said two members when the heat softenable material is softened, the major portions of said two members remaining in substantially fixed position when the electrical connection is broken.

15. A protector for electric circuits comprising contact terminals, a heat generating element that is adapted to fuse and thereby open the circuit on predetermined overload of the protector, a member constructed and arranged to absorb an appreciable portion of the heat generated in the protector, a movable member normally held adjacent to and in direct connection with said heat generating element, said element and said members normally being in electrical conducting relation between said terminals, heat softenable material normally holding said movable member in said electrical conducting relation and constituting the sole means of connecting said heat generating element and said movable member, and means substantially free from current flow therethrough adapted to move said movable member out of said electrical conducting relation and thereby open the circuit adjacent said heat generating element when the heat softenable material has been heated to a predetermined temperature, said heat generating element and said absorbing member remaining in substantially fixed position when the circuit is opened by movement of the movable member.

16. A protector for electric circuits comprising contact terminals, a heat generating element that is adapted to fuse and thereby open the circuit on predetermined overload of the protector, a member constructed and arranged to absorb an appreciable portion of the heat generated in the protector, a movable member, said element and said members normally being in electrical conducting relation between said terminals, heat softenable material normally holding said movable member in said electrical conducting relation, and resilient means substantially free from current flow therethrough adapted to move said movable member out of said electrical conducting relation and thereby open the circuit when the heat softenable material has been heated to a predetermined temperature, said resilient means being coextensive with at least a portion of said absorbing member, said heat generating element and said absorbing member being arranged so all portions thereof remain in substantially fixed position when the circuit is opened by movement of the movable member.

17. A protector for electric circuits comprising contact terminals, a heat generating element that is adapted to fuse and thereby open the circuit on predetermined overload of the protector, a member constructed and arranged to absorb an appreciable portion of the heat generated in the protector, a movable member normally biased for movement by a resilient means, heat softenable material normally holding said members in an assembly, said element and said members normally being in electrical conducting relation between said terminals, said resilient means being adapted to move said movable member out of said electrical conducting relation and thereby open the circuit when the heat softenable material has been heated to a predetermined temperature, said assembly being arranged so one portion of the absorbing member overlies a portion of the movable member and one end of the absorbing member extends longitudinally beyond an end of the movable member and maintains the assembly in said electrical conducting relation, said resilient means biasing said movable member for movement toward the said end of said absorbing member, said absorbing member remaining in substantially fixed position when the circuit is opened by movement of the movable member.

18. A protector for electric circuits comprising contact terminals, a heat generating element that is adapted to fuse and thereby open the circuit on predetermined overload of the protector, a member constructed and arranged to absorb an appreciable portion of the heat generated in the protector, a movable member, said element and said members normally being in electrical conducting relation between said terminals, said element and one of said members constituting arcing contacts for the said protector, resilient means biasing said movable member for movement out of said electrical conducting relation to open the circuit, heat softenable material normally maintaining said electrical conducting relation by preventing such movement of the movable member, said heat generating element and said absorbing member remaining in substantially fixed position when the circuit is opened by movement of the movable member.

19. A protector for electric circuits comprising contact terminals, a heat generating element that is adapted to fuse and thereby open the circuit on predetermined overload of the protector, a member of good thermal conductance that is arranged to absorb an appreciable portion of the heat generated in the protector and thereby increase the time lag thereof, a movable member, said element and said members normally being in electrical conducting relation between said terminals, resilient means biasing said movable member for movement out of said electrical conducting relation, and heat softenable material normally holding said movable member in said electrical conducting relation, said movable member and said member of good thermal conductance being normally related by said material so only a small area of the member of good thermal conductance is intimately contacted by said movable member, said heat generating element and said member of good thermal conductance remaining in substantially fixed position when the circuit is opened by movement of the movable member.

20. A protector for electric circuits comprising contact terminals, a heat generating element that is adapted to fuse and thereby open the circuit on predetermined overload of the protector, a member constructed and arranged to absorb an appreciable portion of the heat generated in the protector and thereby increase the time lag thereof, a movable member, said element and said members normally being in electrical conducting relation between said terminals, heat softenable material normally holding said movable member in said electrical conducting relation, said movable member being arranged so the current path therethrough is relatively short, and means substantially free from current flow therethrough adapted to move said movable member out of said electrical conducting relation and thereby open the circuit when the heat softenable material has been heated to a predetermined temperature, said element and said absorbing member remaining in substantially fixed position when the circuit is opened by movement of the movable member.

21. A protector for electric circuits comprising contact terminals, a heat generating element that is adapted to fuse and thereby open the circuit on predetermined overload of the protector, a member movable to open the circuit, a conducting member that is not fusible under normal operating conditions of the protector and has a portion thereof fixedly attached to a part of the protector which remains in substantially fixed position when the movable member is moved to open the circuit, said element and said members normally being in electrical conducting relation between said terminals, resilient means substantially free from current flow therethrough that biases said movable member for movement out of said electrical conducting relation to open the circuit, heat softenable material normally holding said movable member in said electrical conducting relation that is adapted to lose its holding power when heated to a predetermined temperature, said conducting member being spaced away from said heating element but being electrically connected thereto by means including said movable member, said resilient means and said conducting member being coextensive for a portion of their lengths, said heat generating element remaining in substantially fixed position when the circuit is opened by movement of the movable member.

22. A protector for electric circuits comprising contact terminals, a heat generating element that is adapted to fuse and thereby open the circuit on predetermined overload of the protector, a member of good thermal conductance arranged to absorb an appreciable portion of the heat generated in the protector, a movable member, said element and said members normally being in electrical conducting relation between said terminals, means constituting the sole means of connecting said heat generating element and said movable member, said means being readily consumable by an arc which may be formed when the circuit is opened by movement of the movable member, and means substantially free from current flow therethrough adapted to move said movable member out of said electrical conducting relation to open the circuit when the said means has been heated to a predetermined temperature, said element and said member of good thermal conductance remaining in substantially fixed position when the circuit is opened by movement of the movable member.

23. A protector for electric circuits comprising contact terminals, a heat generating element that is adapted to fuse and thereby open the circuit on predetermined overload of the protector, a member of good thermal conductance constructed and arranged to absorb an appreciable portion of the heat generated in the protector, a movable member, said element and said members normally being in electrical conducting relation between said terminals, heat softenable material adjacent said heating element that normally holds said movable member in said electrical conducting relation, and means substantially free from current flow therethrough adapted to move said movable member out of said electrical conducting relation and thereby open the circuit when the heat softenable material has been heated to a predetermined temperature, said heat generating element having a portion of reduced cross-sectional area within its length adjacent said heat softenable material that is adapted to restrict conduction of heat therethrough, from other portions of said heat generating element, to said heat softenable material, said element and said member of good thermal conductance remaining in substantially fixed position when the circuit is opened by movement of the movable member.

24. A protector for electric circuits comprising contact terminals, a heat generating element that is adapted to fuse and thereby open the circuit, a member of good thermal conductance, a movable member normally biased for movement by a resilient means, heat softenable material normally holding said members in an assembly, said element and said members normally being in electrical conducting relation between said terminals, said resilient means being adapted to move said movable member out of said electrical conducting relation and thereby open the circuit when the heat softenable material has been heated to a predetermined temperature, said assembly being arranged so one portion of the member of good thermal conductance overlies a portion of the movable member and one end of the member of good thermal conductance extends longitudinally beyond an end of the movable member and maintains the assembly in said electrical conducting relation, said element and said member of good thermal conductance remaining in substantially fixed position when the circuit is opened by movement of the movable member.

25. A protector for electric circuits comprising contact terminals, heat generating elements, at least one of said heat generating elements being adapted to fuse and thereby open the circuit on predetermined overload of the protector, and a solder-held assembly comprising a movable member, a member constructed and arranged to absorb an appreciable portion of the heat generated in the protector, and a resilient member biasing said movable member to open circuit position, each of said heat generating elements being directly connected to one of said contact terminals and to said assembly, said elements and said assembly being arranged so substantially all heat transfer therebetween is due to thermal conduction, said heat generating elements and said absorbing member remaining in substantially fixed position when the circuit is opened by movement of the movable member.

26. A protector for electric circuits comprising contact terminals, heat generating elements, at least one of which is adapted to fuse and thereby open the circuit on predetermined overload of the protector, a member of good thermal conductance arranged to absorb an appreciable portion of the heat generated in the protector, said elements and said member normally being in electrical conducting relation between said terminals, a movable member, heat softenable material normally holding said movable member in said electrical conducting relation, and resilient means biasing said movable member for movement out of said electrical conducting relation to open the circuit when the heat softenable material has been heated to a predetermined temperature, said resilient means being longitudinally spaced away from said heat generating elements whereby said resilient means is not coextensive with said elements and whereby transference of heat from said elements to said resilient means is restricted, said heat generating elements and said member of good thermal conductance remaining in substantially fixed position when the circuit is opened by movement of the movable member.

27. A protector for electric circuits comprising contact terminals, heat generating elements, at least one of said heat generating elements being adapted to fuse and thereby open the circuit on predetermined overload of the protector, a member constructed and arranged to absorb an appreciable portion of the heat generated in the protector, said elements and said member normally being in electrical conducting relation between said terminals, a movable member, heat softenable material normally holding said movable member in said electrical conducting relation, and resilient means arranged to move said movable member out of said electrical conducting relation and thereby open the circuit when the heat softenable material is heated to a predetermined temperature, said heat generating elements being positioned so they are oppositely disposed of the movable member and the distance between them is greater than the length of the movable member, said heat generating elements and said absorbing member remaining in substantially fixed position when the movable member is moved to open the circuit.

28. A protector for electric circuits comprising contact terminals, heat generating elements, at least one of said heat generating elements being adapted to fuse and thereby open the circuit on predetermined overload of the protector, a member of good thermal conductance having one end thereof connected to one of the said heat generating elements and being arranged to absorb heat therefrom, a movable member normally held in direct and intimate connection with the other end of said member of good thermal conductance by heat softenable material, said movable member and said member of good thermal conductance being so formed and being so related by said material that most of the heat flowing into the member of good thermal conductance from the said heat generating element connected thereto must flow through substantially the entire length of the member of good thermal conductance before it contacts the movable member or the heat softenable material, said elements and said members normally being in electrical conducting relation between said terminals, resilient means arranged to move said movable member out of said electrical conducting relation and thereby open the circuit when the heat softenable material is heated to a predetermined temperature, said heat generating elements remaining in substantially fixed position when the circuit is opened by movement of the movable member.

29. A protector for electric circuits comprising contact terminals, heat generating elements, at least one of said heat generating elements being adapted to fuse and thereby open the circuit on predetermined overload of the protector, a movable member in contact with one of said heat generating elements, a member constructed and arranged to absorb heat from another of said heat generating elements, said elements and said members normally being in electrical conducting relation between said terminals, resilient means biasing said movable member for movement out of said electrical conducting relation to open the circuit, and heat softenable material normally holding said movable member in said electrical conducting relation, said movable member and said absorbing member being assembled so the main heat flow path therebetween is spaced away from that heat generating element which is in contact with said member of good thermal conductance, a distance greater than the distance moved by said movable member, said absorbing member and said heat generating elements remaining in substantially fixed position when the circuit is opened by movement of the movable member.

30. A protector for electric circuits comprising a casing, contact terminals, heat generating members, at least one of said heat generating members being adapted to fuse and thereby open the circuit on predetermined overload of the protector, a member of good thermal conductance constructed and arranged to absorb an appreciable portion of the heat generated in the protector, a movable member, resilient means biasing said movable member to open circuit position, said members normally being in electrical conducting relation between said terminals, heat softenable material normally holding said movable member in said electrical conducting relation and being adapted to lose its holding power when heated to a predetermined temperature, and filler material contacting and covering substantially all of those portions of said heat generating members that are not in direct engagement with other members of the protector, said heat generating members and said member of good thermal conductance remaining in substantially fixed position when the circuit is opened by movement of the movable member.

31. A protector for electric circuits comprising contact terminals, heat generating elements, at least one of said heat generating elements being adapted to fuse and thereby open the circuit on predetermined overload of the protector, a member constructed and arranged to absorb an appreciable portion of the heat generated in the protector, said elements and said member normally being in electrical conducting relation between said contact terminals, a movable member, heat softenable material normally holding said movable member in said electrical conducting relation, and resilient means arranged to move said movable member out of said electrical conducting relation and thereby open the circuit when the heat softenable material is heated to a predetermined temperature, said heat generating elements being positioned so they are oppositely disposed of the movable member and the distance between them is at least twice as great as the distance moved by the movable member, said heat generating elements and said absorbing member remaining in substantiallly fixed position when the movable member is moved to open the circuit.

32. A protector for electric circuits comprising contact terminals, heat generating elements, at least one of said heat generating elements being adapted to fuse and thereby open the circuit on predetermined overload of the protector, a movable member, a member constructed and arranged to absorb an appreciable portion of the heat generated in the protector, said elements and said members normally being in electrical conducting relation between said terminals, said movable member being spaced away from one of the said heat generating elements a distance greater than the length of travel of the movable member, resilient means biasing said movable member for movement towards the innermost end of the said one heat generating element and heat softenable material normally holding said movable member in said electrical conducting relation, said absorbing member and said heat generating elements remaining in substantially fixed position when the circuit is opened by movement of the movable member.

33. In a fusible electrical protective device, the combination of a pair of conductors and an interposed heat absorbing member electrically connecting said conductors and connected with one of said conductors by a readily fusible metal, and spring means within said heat absorbing member responsive to the fusing of said metal to effect the electrical separation of said heat absorbing member and conductor.

34. A fusible protective device as in claim 33 at least one of said conductors being a fusible link having a readily fusible portion adapted to fuse prior to the fusing of said fusible means when traversed by a sufficiently high current.

35. In a fusible electrical protective device, the combination of a pair of conductors and an interposed heat absorbing member electrically connecting said conductors and connected with one of said conductors by a readily fusible metal, and spring means at least partially within said heat absorbing member responsive to the fusing of said metal to effect the electrical separation of said heat absorbing member and conductor, at least one of said conductors having a part adapted to fuse and interrupt the circuit prior to the fusing of said fusible means when traversed by a sufficiently high current, an enclosing casing containing said conductors and heat absorbing member, and an arc quenching filler surrounding the greater portions of the lengths of said conductors.

36. A protector for electric circuits comprising contact terminals, heat generating elements, at least one of which is adapted to fuse and thereby open the circuit on predetermined overload of the protector, a member constructed and arranged to absorb an appreciable portion of the heat generated in the protector, a movable member, said elements and said members normally being in electrical conducting relation between said terminals, heat softenable material normally holding said movable member in said electrical conducting relation, and resilient means adapted to move said movable member out of said electrical conducting relation and thereby open the circuit when the heat softenable material has been heated to a predetermined temperature, said heat generating elements and said absorbing member remaining in substantially fixed position when the circuit is opened by movement of the movable member, said resilient means being longitudinally spaced away from said elements to restrict radiation of heat from said elements into the said means, and filler material that contacts and covers substantially all portions of said elements that are not in direct engagement with other parts of the protector.

37. A protector for electric circuits comprising contact terminals, heat generating elements, at least one of which is adapted to fuse and thereby open the circuit on predetermined overload of the protector, a member constructed and arranged to absorb an appreciable portion of the heat generated in the protector, a movable member, said elements and said members normally being in electrical conducting relation between said terminals, heat softenable material normally holding said movable member in said electrical conducting relation, and resilient means adapted to move said movable member out of said electrical conducting relation and thereby open the circuit when the heat softenable material has been heated to a predetermined temperature, said heat generating elements and said absorbing member remaining in substantially fixed position when the circuit is opened by movement of the movable member, said resilient means being longitudinally spaced away from said elements to restrict radiation of heat from said elements into the said means, and filler material that contacts and covers substantially all portions of said elements that are not in direct engagement with other parts of the protector, said movable member being arranged so movement thereof will open the circuit adjacent the said fusible heat generating element.

38. A protector for electric circuits comprising contact terminals, heat generating elements, at least one of which is adapted to fuse and thereby open the circuit on predetermined overload of the protector, a member constructed and arranged to absorb an appreciable portion of the heat generated in the protector, a movable member, said elements and said members normally being in electrical conducting relation between said terminals, heat softenable material normally holding said movable member in said electrical conducting relation, and resilient means adapted to move said movable member out of said electrical conducting relation and thereby open the circuit when the heat softenable material has been heated to a predetermined temperature, said heat generating elements and said absorbing member remaining in substantially fixed position when the circuit is opened by movement of the movable member, and filler material that contacts and covers substantially all portions of said elements not in direct engagement with other parts of the protector, said movable member being arranged so movement thereof will open the circuit adjacent the said fusible heat generating element.

39. A protector for electric circuits comprising contact terminals, heat generating members, at least one of which is adapted to fuse and thereby open the circuit on predetermined overload of the protector, a member constructed and arranged to absorb an appreciable portion of the heat generated in the protector, connecting means in contact with two of said members normally maintaining them in electrical conducting relation between said terminals, resilient means adapted to move at least a portion of said connecting means to form a gap, and arc extinguishing filler material, said connecting means and said members being arranged so any arcing in said gap may readily cause a lengthening of the gap until the arc is extinguished by the filler material, said resilient means being longitudinally spaced away from said heat generating members to restrict radiation of heat from said heat generating members into the said resilient means.

40. A protector for electric circuits comprising a casing, heat generating elements arranged to heat whenever current passes through them, at least one of said heat generating elements being adapted to fuse and thereby open the circuit on predetermined overload of the protector, a member of good thermal conductance constructed and arranged to absorb an appreciable portion of the heat generated in the protector, a movable member normally held in direct connection with said fusible heat generating element and said member of good thermal conductance, heat softenable material, a portion of said material that normally contacts said fusible heat generating element and said movable member and constitutes the sole means of connecting them, another portion of said material that normally contacts said movable member and said member of good thermal conductance, said other portion of said material being positioned near that end of the member of good thermal conductance which is remote from said other heat generating element whereby the length of heat flow path through said member of good thermal conductance is substantially equal to the length of that member, resilient means arranged to move said movable member out of direct connection with said fusible heat generating element and thereby open the circuit when the heat softenable material is heated to a predetermined temperature, said resilient means biasing said movable member for movement toward the end of said other heat generating element, said resilient means being longitudinally spaced away from said heat generating elements to restrict transfer of heat between said means and said elements, filler material in said casing that contacts and covers those portions of said heat generating elements that are not directly engaged by other parts of the said protector, said heat generating elements being arranged so the distance between their innermost ends is greater than the length of the movable member and is greater than the distance the movable member is moved, said member of good thermal conductance and said movable member being so formed and arranged that only a portion of the surface of said member of good thermal conductance is intimately contacted by said movable member, said various elements and members being so positioned relative to each other that transfer of heat therebetween is predominately due to thermal conduction, said heat generating elements and said member of good thermal conductance remaining in substantially fixed position when the movable member is moved to open the circuit.

MANFRED F. DUERKOB.